(12) United States Patent
Haustein et al.

(10) Patent No.: US 7,519,635 B1
(45) Date of Patent: Apr. 14, 2009

(54) METHOD OF AND SYSTEM FOR ADAPTIVE SELECTION OF A DEDUPLICATION CHUNKING TECHNIQUE

(75) Inventors: Nils Haustein, Soergenloch (DE); Craig A. Klein, Tucson, AZ (US); Ulf Troppens, Mainz (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,874

(22) Filed: Mar. 31, 2008

(51) Int. Cl.
*G06F 12/00* (2006.01)
*G06F 17/30* (2006.01)
(52) U.S. Cl. .................. 707/204; 707/200; 707/203; 707/205
(58) Field of Classification Search .................. None
See application file for complete search history.

(56) References Cited

U.S. PATENT DOCUMENTS

| | | | |
|---|---|---|---|
| 7,092,956 B2* | 8/2006 | Ruediger ..................... | 707/101 |
| 7,103,602 B2* | 9/2006 | Black et al. ................. | 707/101 |
| 2008/0098083 A1* | 4/2008 | Shergill et al. ............. | 709/217 |
| 2008/0098236 A1* | 4/2008 | Pandey et al. ............... | 713/189 |
| 2008/0133561 A1* | 6/2008 | Dubnicki et al. ............ | 707/101 |
| 2008/0184001 A1* | 7/2008 | Stager ........................ | 711/167 |

OTHER PUBLICATIONS

Balachandran et al. (Sequence of Hashes Compression in Data De-duplication), Data Compression Conference, 2008, DCC, 2008 Mar. 25-27, 2008, pp. 505-505.*

Peter Christen (Febrl-: an open source data cleaning, deduplication and record linkage system with a Graphical User Interface, Conference on Knowledge Discovery in Data, Proceeding of the 14th ACM SIGKDD international conference on knowledge discovery and data mining, 2008, pp. 1065-1068.*

Sarawagi et al. (ALIAS: an active learning led interactive deduplication system), Very Large Data Bases, Proceeding of the 28th internaitonal conference on Very Large Data Bases. 2002, pp. 1103-1106.*

Culotta et al. (Joint deduplication of multiple record types in relational data), Conference on Information and knowledge management, proceedings of the 14th ACM international conference on information and knowledge management, 2005, pp. 257-258.*

(Continued)

*Primary Examiner*—Baoquoc N To
(74) *Attorney, Agent, or Firm*—Dillon & Yudell LLP

(57) ABSTRACT

A method of adaptively selecting an optimum data deduplication chunking method receives a request to deduplicate a file, wherein the file has a file type. The method searches a table of file types, wherein the table includes, for each file type, a chunking method, a deduplication ratio, and a depulication ratio threshold. The method selects a chunking method for the file according to the table. The method chunks the file using the selected chunking method. The method deduplicates the chunked file according to prior art deduplication methods. The method calculates a deduplication ratio for the file type and updates the table with the calculated deduplication ratio for the file type. If the calculated deduplication ratio for the file type is less than the deduplication ratio threshold for the file type, the method selects a new chunking method for the file type and updates the table of file types with the new chunking method for the file type.

1 Claim, 3 Drawing Sheets

OTHER PUBLICATIONS

Conrad et al. (Information retrieval 2: Essential deduplication functions for transactional databases in law, 2007, pp. 261-270.*

Sarawagi et al. (Interactive deduplication using active learning), Conference on knowledge discovery in data, proceeding of the eighth ACM SIGKDD international conference on Knowledge discovery and data mining, 2002, 269-278.*

Bilenko et al. (Adaptive duplicate detection using learnable string similarity measures, Conference on knowledge discovery in data, proceeding of the ninth ACM SIGKDD international conference on knowledge discover and data mining, 2003, 39-48.*

Carvalho et al. (Learning to deduplicate), international conference on digital libraries, proceeding of the 6th ACM/IEEE-CS joint conference on digital libraries, 2006, pp. 41-50.*

Conrad et al. (Online duplicate document detection: signature reliability in a dynamic retrieval environment), Conference on Information and knowledge management, proceedings of the twelfth international conference on information and knowledge management, 2003, 443-452.*

Bouffard, et al., "Sepaton S2100: Fast, Scalable, Space-efficient Disk-based Backup", ESG Lab Validation Report, Sep. 2007, pp. 1-17, Enterprise Strategy Group, Inc.

* cited by examiner

| FILE TYPE | EXTENSION | CHUNKING METHOD | DEDUPLICATION RATIO | THRESHOLD |
|---|---|---|---|---|
| POWERPOINT | ppt, pps | FORMAT BASED | | |
| WORD | doc, docx | FORMAT BASED | | |
| TEXT | txt, log, out | FINGERPRINTING | | |
| SOURCE CODE | c, cpp, h, hpp | FINGERPRINTING | | |
| PICTURE | jpg, tiff | FINGERPRINTING | | |
| VIDEO | div, mpeg | FINGERPRINTING | | |
| MUSIC | mp3, wav | FINGERPRINTING | | |
| FIXED CONTENT DOCUMENT | pdf | FILE BASED | | |
| EXECUTABLE | exe | BLOCK BASED | | |
| DEFAULT | * | BLOCK BASED | | |

FIG. 3

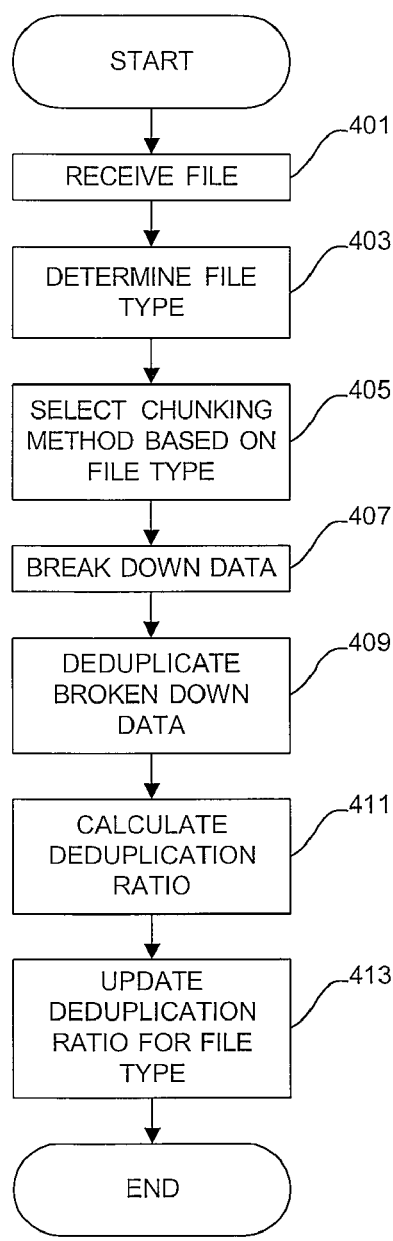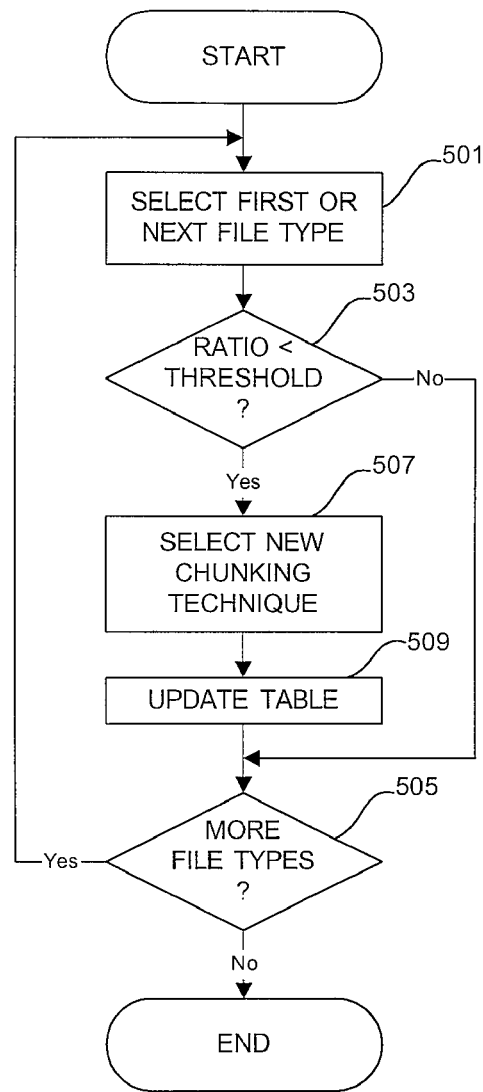
FIG. 4
FIG. 5

METHOD OF AND SYSTEM FOR ADAPTIVE SELECTION OF A DEDUPLICATION CHUNKING TECHNIQUE

BACKGROUND OF THE INVENTION

1. Technical Field

The present invention relates in general to the field of data deduplication, and more particularly to a method of and system for adaptively selecting an optimum deduplication chunking method for files of a particular type.

2. Description of the Related Art

A goal in data storage is to reduce the amount of space required to store the data. One method of reducing required storage space is data deduplication. In data deduplication, a data object, which may be a file, a data stream, or some other form of data, is broken down into one or more chunks using a chunking method. A hash is calculated for each chunk using any of several known hashing techniques. The hashes of all chunks are compared for duplicates. Duplicate hashes mean either the data chunks are identical or there has been a hash collision. A hash collision occurs when different chunks produce the same hash. To prevent hash collisions, other techniques such as bit-by-bit comparison may be performed. After the comparison of hashes and proof of their uniqueness, unique chunks are stored. Chunks that are duplicates of already stored chunks are not stored; rather, such chunks are referenced by pointers to the already stored chunks.

Data deduplication can yield storage space reductions of 20:1 or more. However, the deduplication ratio is highly dependent upon the method used to chunks the data. Several chunking techniques have been developed. Each chunking method is thought to be optimum for a set of file types. However, a particular chunking method may not in fact be optimum for a particular file type.

SUMMARY OF THE INVENTION

Embodiments of the present invention provide methods of and systems adaptively selecting an optimum data deduplication chunking method. The method receives a request to deduplicate a file, wherein the file has a file type. The method searches a table of file types, wherein the table includes, for each file type, a chunking method, a deduplication ratio, and a depulication ratio threshold. The method selects a chunking method for the file according to the table. The method chunks the file using the selected chunking method. The method deduplicates the chunked file. The method calculates a deduplication ratio for the file type and updates the table with the calculated deduplication ratio for the file type. If the calculated deduplication ratio for the file type is less than the deduplication ratio threshold for the file type, the method selects a new chunking method for the file type and updates the table of file types with the new chunking method for the file type.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 illustrates an embodiment of a table of file types according to the present invention.

FIG. 4 is a flow chart of an embodiment of a process for selecting an optimum chunking method according to the present invention; and, FIG. 5 is a flow chart of an embodiment of a process for updating a table of file types according to the present invention.

DETAILED DESCRIPTION OF THE PREFERRED EMBODIMENT

Figure 1:
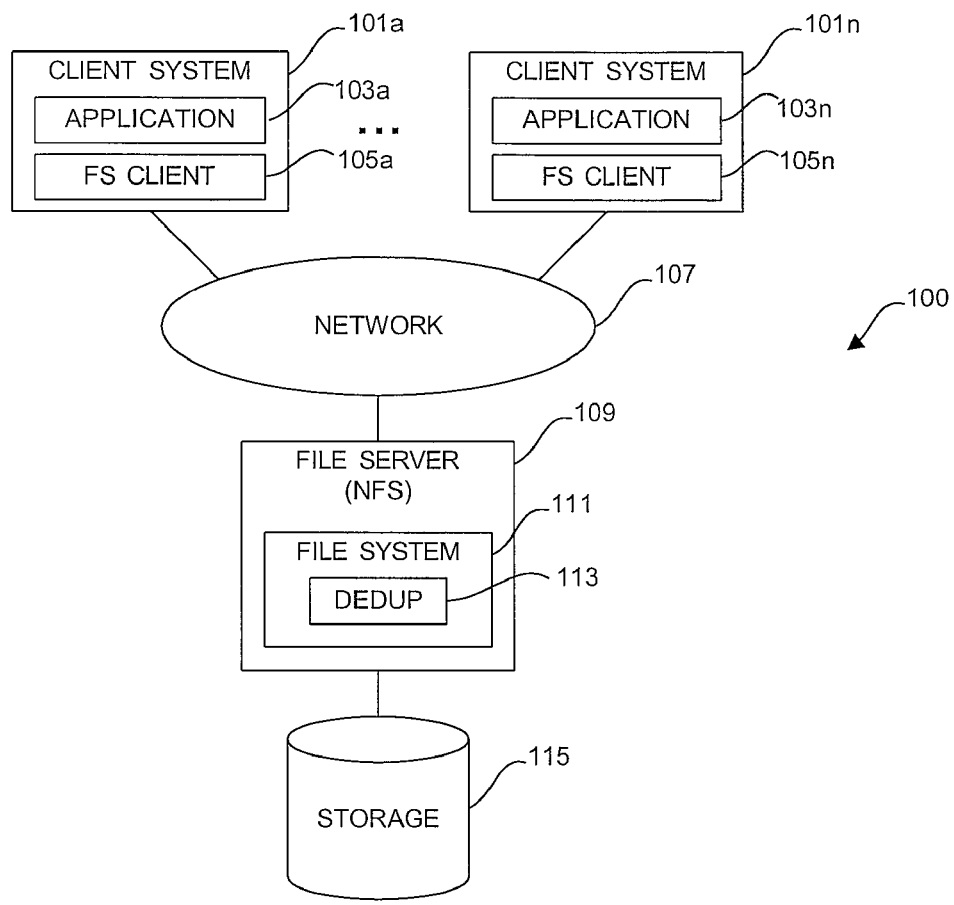
FIG. 1 is a block diagram of network file server based embodiment according to the present invention.

Referring now to drawings, and first to FIG. 1, an embodiment of a system according to the present invention is designated generally by the numeral 100. System 100 includes a plurality of client systems 101. Each client system 101 is coupled to a network 107. Network 107 may be a storage area network, or other suitable network. A file server 109 is coupled to network 107.

Each client system 101 includes at least one application 103, which may be a text processor, a database, or other repository managing images, documents, video streams, or any other kind of data. Client systems 101 also each include a file system client 105. The configuration of file system client 105 depends upon the configuration of the file system. For example, if the file system is a network file system then file system client 105 incorporates the appropriate interface of the network file system.

File server 109 includes a file system 111. File system 111 includes a deduplication component 113 according to the present invention. The operation of deduplication component 113 will be described in detail hereinafter. Data stored in file system 113 is placed on a storage system 115, which may be a disk storage system or the like.

Applications 103 create and manage data files that are stored in network attached file server 109 through respective file system clients 105. When an application 103 stores a file, the application passes the file to its respective file system client 105, which in turn transfers the file through network 107 to file server 109. Deduplication component 113 performs deduplication according to the present invention. The deduplicated file is stored in storage system 115.

Figure 2:
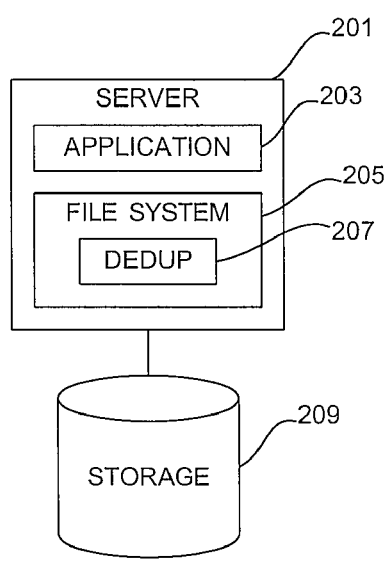
FIG. 2 is a block diagram of standalone client based embodiment according to the present invention.

Referring to FIG. 2, embodiments of the present invention may be included in a single server system 201. Server 201 includes an application 203, which may be any type of application described with reference to FIG. 1. Server 201 includes a file system 205 which includes a deduplication component 207 according to the present invention. Server 201 is coupled to a storage system 209, which may be any suitable storage system, such as a disk storage system. When application 203 stores the file, the application passes the file directly to file system 205. Deduplication component 207 deduplicates the file according to the present invention. Filesystem 205 stores the deduplicated file in storage system 209.

Embodiments of deduplication components according to the present invention include a table that maps file types to the most appropriate chunking methods. Referring to FIG. 3, there is illustrated an example of a table 301 of file types. Table 301 includes a file type column 303 that lists file types that may be deduplicated according to the present invention. The file types listed in column 303 are merely examples and do not comprise an exhaustive listing. An extension column 305 lists file name extensions associated with each file type. In embodiments of the present invention, a file's type may be determined by referring to its file name extension.

Table 301 includes a chunking method column 307 that lists the preferred chunking method associated with each file type in column 303. The chunking methods in column 307 include format aware or format based, fingerprinting, file days, and block-based. Format based chunking methods understand the data formats of the data file and breakup the data based upon its format. For example, a first PowerPoint™ file may comprise 30 pages and a second PowerPoint™ file may comprise the same 30 pages plus one additional page. Format based chunking breaks down the two PowerPoint files into one page chunks. Deduplication references the 30 pages of the second file to the 30 pages of the first file and stores the additional page separately.

Fingerprinting chunking methods look for logical breaks in the data and breaks up the data into chunks based upon logical breaks. The format of the data is not relevant. In file based chunking, the entire data file is kept as an entity and is not broken down. File based chunking is generally applied to files with fixed content such as PDF files. In block based chunking, the data file is broken down into fixed blocks.

Table 301 includes a deduplication ratio column 309. Deduplication ratio is a measure of the efficiency of a deduplication method. A deduplication ratio for a file is calculated by dividing the space that would required to store the original file by the space required to store the deduplicated file. As will be explained in detail hereinafter, as files are deduplicated according to an embodiment of the present invention, a deduplication ratio is calculated for each file. Then, an average deduplication ratio is calculated for the file type by dividing the sum of the individual deduplication ratios achieved for files of that type by the number of files of that type deduplicated. Then, the deduplication ratio for that file type is updated in column 309 with the calculated average deduplication ratio.

Table 301 includes a deduplication threshold column 311. A deduplication threshold is selected for each file type. As will be explained in detail hereinafter, if the average deduplication ratio in column 309 for a file type is less than the threshold list in column 311, a new chunking method is selected for the file type and column 307 is updated with the new chunking method. The deduplication threshold in column 311 is configurable by the user of system 100 or 200.

FIG. 4 is a flow chart of an embodiment for the adaptive selection of a deduplication chunking method implemented in deduplication component 113 of FIG.1 or 207 of FIG. 2 according to the present invention. The deduplication component receives a file, at step 401. The deduplication component determines the file type 305 of the received file by referring to its file name extension 305, at step 403, and using table 301. Then, the deduplication component selects from table 301 a chunking method 307 based on the file type 303, as indicated at block 405. The deduplication component breaks down or chunks the data, at block 407, using the selected chunking method. Then, the deduplication component deduplicates the broken down a data, at block 409, according prior art deduplication methods. The deduplication component calculates the deduplication ratio for the file and for the file type in the manner described above, at block 411.

Then, the deduplication component updates the deduplication ratio for the file type in column 309 of table 301, at block 413.

FIG. 5 is a flow chart of an embodiment of a process for updating the chunking method according to the present invention which is implemented in the inventive deduplication component 113 of FIG.1 or 207 of FIG. 2. The deduplication component selects a first or next file type from table 301, at block 501. The deduplication component tests, at decision block 503 if the deduplication ratio in column 309 is greater than the threshold in column 311 of the file type. If not, the deduplication component tests, at decision block 505, if there are more file types. If not, processing ends. If, as determined at decision block 503, the deduplication ratio is greater than the threshold, a new chunking method is selected for the file type, at block 507, and column 307 of table 301 is updated with the new chunking method, as indicated at block 509. Processing according to FIG. 5 continues until all file types have been analyzed. FIG. 5 illustrates a periodic batch processing of table 301. Those skilled in the art will recognize that the chunking method may be analyzed and updated necessary after each deduplication of a file of a particular type.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of selecting an optimum deduplication chunking method, which comprises:

receiving a request to deduplicate a file, said file having a file type;

searching a table of file types, said table including for each file type, a chunking method, a deduplication ratio, and a user configurable deduplication ratio threshold;

selecting a chunking method for said file according to said table;

chunking said file using said selected chunking method;

deduplicating said chunked file;

calculating a deduplication ratio for said file type by dividing a sum of individual deduplication ratios achieved for files of said file type by a number of files of said file type deduplicated;

updating said table with said calculated deduplication ratio for said file type;

if said calculated deduplication ratio for said file type is equal to or greater than said deduplication ratio for said file type, maintaining said chunking method for said file type in the said table;

if said calculated deduplication ratio for said file type is less than said deduplication ratio threshold for said file type, selecting a new chunking method for said file type; and, updating said table with said new chunking method for said file type.

* * * * *